United States Patent [19]

Piechocki

[11] Patent Number: 5,118,729

[45] Date of Patent: Jun. 2, 1992

[54] MODIFIED POLYOXYETHYLENE EPOXY RESIN AMPHIPHILES AND STABLE AQUEOUS EPOXY DISPERSIONS THEREOF

[75] Inventor: Christian Piechocki, Kaltenhouse, France

[73] Assignee: The Dow Chemical Company, Midland, Mich.

[21] Appl. No.: 638,485

[22] Filed: Jan. 4, 1991

[51] Int. Cl.$^5$ .................. C08K 3/20; C08G 59/12; C08L 63/02

[52] U.S. Cl. .................... 523/404; 525/533; 528/110; 528/111

[58] Field of Search .............. 528/110, 111; 523/404; 525/533

[56] References Cited

U.S. PATENT DOCUMENTS

| | | | |
|---|---|---|---|
| 3,799,797 | 3/1974 | Hughes | 117/72 |
| 4,130,517 | 12/1978 | Landberg et al. | 260/29.2 N |
| 4,154,709 | 5/1979 | Ukita et al. | 260/835 |
| 4,173,693 | 11/1979 | Au et al. | 525/329 |
| 4,315,044 | 2/1982 | Elmore et al. | 427/386 |
| 4,497,945 | 2/1985 | Salloum et al. | 528/94 |
| 4,710,420 | 12/1987 | Tonoki et al. | 525/191 |
| 4,797,464 | 1/1989 | Nodelman | 528/110 |

FOREIGN PATENT DOCUMENTS

| | | |
|---|---|---|
| 0109173 | 5/1984 | European Pat. Off. |
| 0202765 | 11/1986 | European Pat. Off. |
| 49-94786 | 9/1974 | Japan |
| 1319448 | 6/1973 | United Kingdom |

Primary Examiner—John C. Bleutge
Assistant Examiner—Christopher P. Rogers

[57] ABSTRACT

The invention is a compound useful for emulsifying an epoxy resin in water, which corresponds to $$A-X-O-(CH_2CH_2O)_n-R$$

wherein:

X is the residue of a difunctional compound which is capable of reacting with the primary hydroxy moiety of a monoalkylether of a polyethylene glycol and a 1,2-glycidyl ether moiety;

R is $C_{1-10}$ alkyl moiety; and n is a positive real number such that the composition is emulsifiable in water.

In another embodiment the invention is a water emulsifiable epoxy resin composition which comprises an epoxy resin and the compounds described above. The epoxy resin compositions of this invention are useful in water-borne coating compositions.

22 Claims, No Drawings

MODIFIED POLYOXYETHYLENE EPOXY RESIN AMPHIPHILES AND STABLE AQUEOUS EPOXY DISPERSIONS THEREOF

BACKGROUND OF INVENTION

This invention relates to a new class of polyoxyethylene modified epoxy resins and their preparation. Epoxy resins of this type are readily dispersable in water to provide useful coating compositions when cured.

The ever increasing need to reduce air pollution hazards caused by the volatilization of organic solvents has created an increased interest and importance in water-borne resin coating systems. This invention is directed to a new class of compounds that are useful for the preparation of aqueous based epoxy resin dispersions useful as coatings. Many of the dispersions of this invention do not require the use of any additional co-solvents. Other dispersions of this invention require significantly less of such co-solvents as compared to conventional epoxy resin coating systems.

U.S. Pat. No. 4,315,044 discloses an epoxy dispersion comprising an aqueous medium and a self-emulsifying epoxy resin which is the addition product of a liquid epoxy resin, a dihydric phenol such as bisphenol A and a diglycidyl ether of polyoxyalkylene glycol. These glycols are commercial Pluronic (BASF—Wyandotte) type surfactants which are block copolymers of ethylene oxide and propylene oxide having a molecular weight of 5000-10,000 containing about 50 to about 90 weight percent ethylene oxide and from about 10 to about 50 weight percent propylene oxide.

European Patent Application 0 202 765 utilizes essentially the same formulation as disclosed in U.S. Pat. No 4,315,044 but additionally requires approximately 8 weight percent of propylene glycol monomethyl ether as a co-solvent.

U.S. Pat. No. 4,154,709 discloses a modified epoxy resin in which no residual reactive epoxy groups remain. The system is essentially not an aqueous based system. Curing is achieved via the secondary hydroxyl groups with isocyanates.

European Patent Specification 0 109 173 discloses aqueous epoxy resin coating systems which are obtained by modifying the epoxy resin with a group of polyoxyalkylenediamine derivates prior to curing. The polyoxyalkylene diamines derivatives are known emulsifying agents which are block copolymers of ethylene oxide and propylene oxide that have been terminated with a primary amino group and which have a molecular weight of 900 to 5000.

Block copolymers with hydrophilic and hydrophobic block are also known. Au U.S. Pat. No. 4,173,693 discloses a water insoluble phase transfer catalyst comprising a polymer matrix of a water insoluble polymer bound to a poly alkylene glycol ether. The polymer matrices disclosed are based on styrene, styrene-divinyl benzene, styrene-glycoldimethylacrylate, urea-formaldehyde, aryl/polyamine-formaldehyde, phenol formaldehyde, polyacrylate and the like.

Lundberg U.S. Pat. No. 4,130,517 discloses multiphase block copolymers of hydrophilic blocks and hydrophobic blocks, wherein the copolymer must have an internal hydrophilic block. The hydrophilic blocks disclosed are based on ethylene oxide, acrylamide, alpha-hydroxy ethyl methacrylate, and vinylpyrolidone. The hydrophobic polymer blocks disclosed are selected from the group of styrene, t-butylstyrene, alpha-methyl styrene, vinyl toluene, methyl methacrylate, polyamides, methacrylonitrile, acrylonitrile monomers and polylactones.

Japan Kokai 7,494,786 discloses blending epoxy resins and/or unsaturated polyesters with nonionic surfactants, which contain polyethyleneoxide chains. Such blends are used to prepare organic solvent based coatings.

Hughes 3,799,797 discloses simultaneously crosslinking an epoxy resin with a diisocyanate and attaching to the epoxy resin a polyethylene glycol with a portion of the di-isocyanates. The epoxy resins provide scale resistant coatings.

The above mentioned references do not provide a means for emulsifying in water epoxy resins which are not naturally water emulsifiable. The references do not disclose a compound or composition which is effective in performing such emulsification.

What are needed are agents, compounds or compositions which can emulsify in water epoxy resins which are not emulsifiable in water. What are needed are water emulsions of epoxy resin which contain epoxy resins which are not self-emulsifiable. What are further needed are coatings prepared from water emulsions of standard epoxy resins.

SUMMARY OF INVENTION

The invention relates to a novel compound useful for emulsifying an epoxy resin in water. Such compound is exemplified by formula 1

$$A-X-O-(CH_2CH_2O)_n-R \qquad (1)$$

wherein:

A is the residue of a polyglycidyl ether of a polyhydroxy hydrocarbon and is the reaction product of an epihalohydrin with one or more polyhydroxyhydrocarbons or halogenated polyhydroxyhydrocarbons; or the reaction product of a polyglycidylether of a polyhydroxy hydrocarbon with one or more polyhydroxy hydrocarbons, halogenated polyhydroxyhydrocarbons, or a carboxyl substituted hydrocarbon or a mixture thereof;

X is the residue of a difunctional compound which is capable of reacting with the primary hydroxy moiety of a monoalkylether of a polyethylene glycol and a 1,2-glycidyl ether moiety;

R is $C_{1-10}$ alkyl moiety; and n is a positive real number such that the composition s emulsifiable in water.

In another embodiment the invention is a water emulsifiable epoxy resin composition which comprises an epoxy resin comprising a polyglycidyl ether of a polyhydroxy hydrocarbon, halogenated polyhydroxy hydrocarbon, or the reaction product of a polyglycidyl ether of a polyhydroxy hydrocarbon, or halogenated polyhydroxy hydrocarbon with one or more polyhydroxy hydrocarbons, halogenated polyhydroxy hydrocarbons, or carboxylic acid substituted hydrocarbons; and a sufficient amount of a compound corresponding to formula 1 to render the composition emulsifiable in water. In one embodiment a compound corresponding to formula 1 is added to an epoxy resin composition. In another embodiment such a compound is formed in situ during the polyaddition reaction with molecular weight advancement of an epoxy resin.

The epoxy resin compositions of this invention are useful in water-borne coating compositions. The compositions are stable in water. Further such compositions facilitate the use of epoxy resin coating compositions without organic solvents, or with less organic solvents than used in prior systems.

DETAILED DESCRIPTION OF THE INVENTION

The novel compounds of this invention are formed by attaching a hydrophilic moiety via a linking group to the hydrophobic epoxy moiety. The hydrophilicity must be sufficient to allow the stable emulsification of the total epoxy composition in water. There are two primary variables that affect the stability of the emulsifier. First the size of the hydrophilic moiety and secondly the amount of the emulsifier present in the emulsifiable epoxy resin composition. In order to prepare stable aqueous epoxy resin dispersions in accordance with this invention, a high molecular weight polyoxyethylene group is attached to an epoxy resin via a particular linking group. Thus, the resulting molecule comprises an epoxy resin moiety, which serves as the hydrophobic portion of the molecule, and a long chain polyoxyethylene moiety, at the other end of the molecule, which serves as the hydrophilic moiety. When placed in a hydrophilic environment, it is believed that such molecules surround other insoluble epoxy resin particles to form stable aggregates or dispersions of epoxy resins in water. Such molecules are called amphiphiles from the Latin word "amphi-" meaning around.

The hydrophile used herein is the residue of a monoether of a polyethylene glycol. Preferably the monoether corresponds to formula 2

$$R-O-(CH_2CH_2O)_n-H \qquad 2$$

wherein R and n are as previously defined. The size of the residue of the monoether of the polyethylene glycol affects the hydrophilicity of the compound. The skilled artisan can adjust the size of such chain to achieve the desired stable epoxy resin in water emulsion. The selection of the ethers size, or in particular the number of oxyethylene units in the chain is influenced by the hydrophobicity of the epoxy resin used, and the total amount of the emulsifier used in forming the stable epoxy resin emulsion. The size of the ether residue, or more particularly the number of oxyethylene units in the chain, is chosen to render the final epoxy composition water dispersable.

With respect to formula 2, R is preferably a $C_{1-3}$ alkyl group and most preferably a methyl group. With respect to the number of oxyethylene units in the chain, n is selected to render the final epoxy resin composition capable of forming a stable emulsion in water. Preferably, n is a positive real number of from about 16 to about 100, and more preferably from about 16 to about 50. Monoethers of polyethylene glycols generally contain a distribution of compounds with a varying number of oxyethylene units, n. Generally, the quoted number of units is the whole number closest to the statistical average, and the peak of the distribution. Positive real number as used herein refers to a number which is positive and includes integers and fractions of integers. The variable n is best described by a positive real number which is represented by the integer closest to the statistical average of the oxyethylene units in the molecules represented.

The hydrophobic portion of the emulsifier is the residue of a polyglycidyl ether of a polyhydroxy hydrocarbon. Such compound is the reaction product of an epihalohydrin with one or more polyhydroxy hydrocarbons or halogenated polyhydroxy hydrocarbons. Alternatively, such compound may be the reaction product of a polyglycidyl ether as described hereinbefore, with one or more polyhydroxy hydrocarbons, halogenated polyhydroxy hydrocarbons, carboxyl substituted hydrocarbons, or a mixture thereof.

The simple polyglycidyl ethers of a polyhydroxy hydrocarbon are prepared by reacting an epihalohydrin with a polyhydroxy hydrocarbon or a halogenated polyhydroxy hydrocarbon. The preparation of such compounds is well known in the art.

The epihalohydrins correspond to formula 3

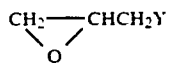

wherein Y is a halogen; preferably chloro or bromo, and most preferably chloro.

Polyhydroxy hydrocarbon means herein a compound with a hydrocarbon backbone and more than one primary hydroxy moieties, preferably two or more. Halogenated polyhydroxy hydrocarbon means herein a compound with a hydrocarbon backbone which is substituted with one or more halogens and more than one, preferably two or more, primary hydroxy moieties.

Among preferred classes of polyhydroxy hydrocarbons and halogenated polyhydroxy hydrocarbons are the bisphenols; halogenated bisphenols; hydrogenated bisphenols; novolac resins, i.e. the reaction product of phenols and simple aldehydes, preferably formaldehyde; and polyalkylene glycols.

Preferred polyhydroxy hydrocarbons, and halogenated polyhydroxy hydrocarbons include those corresponding to formulas 4 to 7.

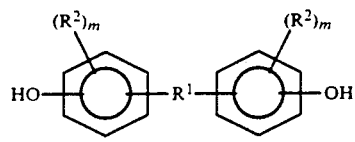

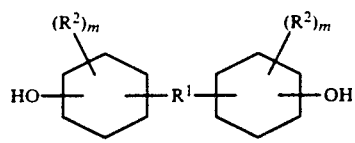

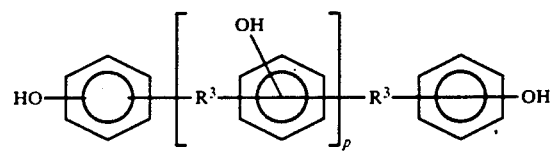

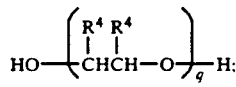

wherein:

$R^1$ is $C_{1-10}$ alkylene, $C_{1-10}$ haloalkylene, $C_{4-10}$ cycloalkylene, carbonyl, sulfonyl, sulfinyl, oxygen, sulfur or a direct bond;

$R^2$ is $C_{1-3}$ alkyl or a halogen;

$R^3$ is $C_{1-10}$ alkylene;

$R^4$ is H or methyl, with the proviso that only one $R^4$ on an ethylene unit can be methyl;

m is independently in each occurrence an integer of about 0 to about 4;

p is a positive real number of about 0 to about 10;

q is a positive real number of about 1 to about 80.

$R^1$ is preferably $C_{1-3}$ alkylene, $C_{1-3}$ haloalkylene, carbonyl, sulfur, or a direct bond. $R^1$ is more preferably a direct bond, propylene, or fluorinated propylene ($=C(CF_3)_2-$). $R^1$ is most preferably propylene. $R^2$ is preferably methyl, bromo or chloro; and most preferably methyl or bromo. $R^3$ is preferably $C_{1-3}$ alkylene. Preferably, m is an integer of about 0 to about 2. Preferably, p is a positive real number of about 0 to about 8; and more preferably about 0 to about 4. Preferably, q is a positive real number between about and about 40, and more preferably between about 2 and about 20 and most preferably between about 5 and about 15.

Among preferred polyhydroxy hydrocarbon are the dihydroxy phenols. Preferable dihydroxy phenols include those which contain substitutuents that are non reactive with the phenolic groups. Illustrative of such phenols are 2,2-bis(3,5-dibromo-4-hydroxyphenyl) propane; 2,2-bis(4-hydroxyphenyl) propane; 2,2-bis(1,3,5-dichloro-4-hydroxyphenyl) propane; bis (4-hydroxyphenyl) methane; bis (4-hydroxyphenyl) sulfone; bis (4-hydroxyphenyl) sulfide; resorcinol; hydroquinone; and the like. The preferred dihydroxy phenolic compound is 2,2-bis(4-hydroxyphenyl) propane (bisphenol A).

As used herein haloalkyl refers to a compound with a carbon chain and one or more of the hydrogens replaced with a halogen. Haloalkyl also means compounds wherein all of the hydrogen atoms have been replaced by halogen atoms. Alkylene as used herein refers to a divalent alkyl moiety.

The reaction of epihalohydrin with a polyhydroxy hydrocarbon or a halogenated derivative thereof is well known in the art. See Kirk-Othmer Encyclopaedia of Chemical Technology 3rd Ed. Vol 9 pp 267–289, incorporated herein by reference. The simple epoxy resins prepared by this process preferably correspond to one of formulas 8 to 11.

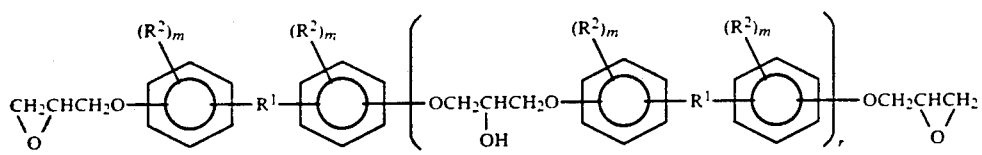

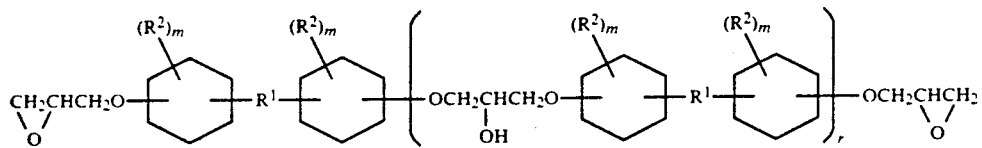

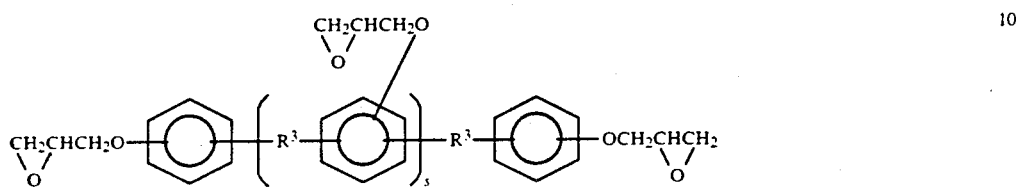

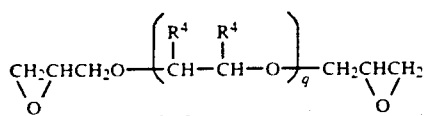

wherein $R^1$, $R^2$, $R^3$, $R^4$, m, and q are as defined previously; r is a positive real number of 0 to 40; and s is a positive real number of about 0 to about 10. Preferably, r is a positive real number of about 0 to about 10, and most preferably about 1 to about 5. Preferably, s is a positive real number of about 0 to about 8; and most preferably about 1 to about 4. All of the variables herein referred to as positive real numbers, are average numbers as the compounds referred to contain a distribution of units referred to.

The hydrophobic portion of the emulsifier, the epoxy resin portion, can also be a complex advanced epoxy resin. Such resins are the reaction product of one or more of the polyglycidyl ethers of a polyhydroxy compound or halogenated derivative thereof, such compounds being described previously, with one or more polyhydroxy hydrocarbons or a halogenated derivative thereof. Such polyhydroxy hydrocarbons have been described previously. Alternatively, the polyglycidyl ether of the polyhydroxy hydrocarbon or halogenated derivative thereof can be reacted with a carboxyl substituted hydrocarbon. A carboxyl substituted hydrocarbon is a compound with a hydrocarbon backbone and one or more carboxyl moieties, preferably more than one, and most preferably two. Preferably such compounds correspond to formula 12.

$$R^5(COOH)_t \qquad 12$$

wherein $R^5$ is $C_{1-40}$ hydrocarbyl moiety optionally containing oxygen along the backbone, and t is an integer of one or greater. $R^5$ is preferably a $C_{1-40}$ straight or branched chain alkane or alkene, optionally containing oxygen. Preferably t is about 1 to about 4, and most preferably 2. Fatty acids and fatty acid dimers are among the useful carboxylic acid substituted hydrocarbons. Included in the fatty acids are caproic acid, caprylic acid, capric acid, octanoic acid, versatic acid, decanoic acid, lauric acid, myristic acid, palmitic acid, stearic acid, palmitoleic acid, oleic acid, linoleic acid, linolenic acid, erucic acid, pentadecanoic acid, margaric acid, arachidic acid, and dimers thereof.

In one preferred embodiment a one or more polyhydroxy hydrocarbons or halogenated derivatives thereof and one or more carboxyl substituted hydrocarbons are reacted with the polyglycidyl ether of a polyhydroxy compound or halogenated derivative thereof. Procedures for performing such a reaction are well known in the art. See "The Handbook of Epoxy Resins" by H. Lee and K. Neville (1967) McGraw Hill, New York, and U.S. Pat. Nos. 2,633,458; 3,477,990; 3,821,243; 3,907,719, 3,975,397; and 4,071,477. Optionally, a small amount of a monohydroxy substituted hydrocarbon can be included in the reaction mixture.

The linking group is the residue of a compound which is capable of reacting with both the primary hydroxy moiety of a monoalkyl ether of a polyethylene glycol, and a 1,2-epoxy moiety of a polyglycidyl ether of a polyhydroxy hydrocarbon. Any compound that has both a moiety reactive with the hydroxy moiety and a moiety reactive with a glycidyl moiety can be used. In a preferred embodiment such a compound is a dicarboxylic acid or anhydride of a dicarboxylic acid. Preferred dicarboxylic acids or anhydrides of dicarboxylic acids correspond to one of formulas 13 or 14

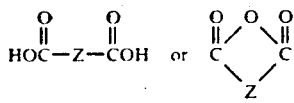

13  14 wherein Z is a $C_{1-20}$ hydrocarbylene moiety. In this embodiment, X is represented by formula 15, wherein the carbonyl moiety is bound to the residue of the poly(oxyethylene) monoalkyl ether.

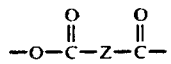  15

Preferably Z is $C_{1-20}$ alkylene, $C_{3-20}$ cycloalkylene, $C_{4-20}$ alkylene substituted cycloalkylene, $C_{6-20}$ arylene, or $C_{7-20}$ alkyl substituted arylene. More preferably Z is $C_{1-20}$ alkylene $C_{5-6}$ cycloalkylene, $C_{6-12}$ arylene, $C_{7-20}$ alkylene substituted cycloalkylene or $C_{7-20}$ alkylsubstituted arylene. In a most preferred embodiment Z corresponds to formulas 16 or 17;

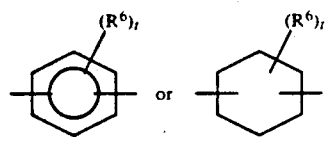

16  17 wherein $R^6$ is $C_{1-10}$ alkyl, and t is 0 or 1. Preferably $R^6$ is $C_{1-3}$ alkyl; and most preferably methyl. Among preferred anhydrides useful in this invention are phthalic anhydride, 1,2,5,6-tetrahydrophthalic anhydride, 3-methylhexahydrophthalic anhydride, and 3-ethylhexahydrophthalic anhydride. The anhydrides are preferred over the carboxylic acids, and the cycloaliphatic anhydrides are more preferred as they provide a product which is more stable to hydrolysis than aromatic anhydrides. The 3-alkylhexahydrophthalic anhydrides are the most preferred because of their high stability. 3-methylhexahydrophthalic anhydride is the most readily available.

The emulsifier compound of this invention is prepared by a two step process. In the first step the alkyl monoether of a polyethylene glycol is reacted with the linking compound. In the second step the reaction product is reacted with a polyglycidyl ether of a polyhydroxy compound or a halogenated derivative thereof to prepare the emulsifier compound.

In particular the process for preparing a compound of the formula 1 comprises first, contacting a monomethyl ether of a polyethylene glycol of formula 2 with a dicarboxylic acid or acid anhydride which corresponds to one of formulas 13 and 14, at elevated temperatures under conditions such that a compound, corresponding to formula 18

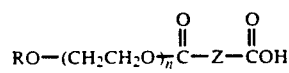  18 is prepared.

Second, the reaction product of step 1 is contacted with a polyglycidyl ether of a polyhydroxy hydrocarbon or the reaction product of a polyglycidyl ether of a polyhydroxy hydrocarbon with one or more polyhydroxy hydrocarbons, halogenated polyhydroxy hydrocarbons or carboxyl acid substituted hydrocarbons, in the presence of a catalyst for the reaction of a 1,2 epoxy moiety (1,1,2-glycidyl moiety) with a hydroxy or carboxyl moiety at elevated temperatures under conditions such that a compound corresponding to formula 1 is prepared.

In another embodiment this invention relates to a process for the preparation of a water dispersible resin composition. This process comprises, first, contacting a monoalkyl ether of a polyethylene glycol with a dicarboxylic acid or acid anhydride at elevated temperatures under conditions such that an adduct of the monoalkylether of the polyethylene glycol and the dicarboxylic acid or acid anhydride is formed. The process further comprises, second, contacting
  a) the adduct of the monoalkyl ether of the polyethylene glycol with the dicarboxylic acid or acid anhydride from the first step,
  b) a polyglycidyl ether of a polyhydroxy hydrocarbon or halogenated polyhydroxy hydrocarbon, and
  c) optionally a polyhydroxy hydrocarbon, wherein the reactive hydroxy moieties are bound to an aromatic ring, in the presence of a catalyst capable of catalyzing the reaction between the 1,2 glycidyl ethers and hydroxy moieties at elevated temperatures under conditions such that a water dispersible epoxy resin composition is formed. The residue of the monomethyl ether of the polyethylene glycol preferably has sufficient oxyethylene units to render the epoxy resin composition emulsifiable in water.

In the first step the alkyl monoether of a polyethylene glycol is contacted with the linking compound described hereinbefore in stoichimetric amounts at elevated temperatures. In the embodiment wherein the linking compound is an anhydride or dicarboxylic acid stoichiometric amounts of the ether and the dicarboxylic acid or anhydride are contacted with mixing. The contacting is preferably performed in the absence of a solvent, although a solvent may be used. After contacting the reaction mixture is heated to a temperature of from about 50° C. to about 250° C., more preferably from about 90° C. to about 150° C. The actual temperature chosen for this first step is dependent on the choice of linking compound. If a dicarboxylic acid is used, temperatures in the upper end of the above range are preferred. In this embodiment preferred temperatures are from 150° to 250° C.; with from 180° to 220° C. being most preferred. If the linking compound is anhydride temperatures in the lower end of the range are preferred. In this embodiment the preferred temperatures are from 90 to 150 most preferred. The reaction mixture is heated for a period of from 0.5 to 6 hours, preferably from 1 to 2 hours. It is preferable to perform this reaction under an inert atmosphere, such as nitrogen. The reaction product is recovered in nearly quantitive quantities. The product recovered is a poly (oxyethylene) half ester of a dicarboxylic acid (hereinafter half ester). In a preferred embodiment such compound corresponds to formula 18.

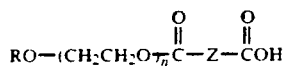

In the embodiment where a 3-alkylhexahydrophthalic anhydride is the linking compound such a product corresponds to formula 19:

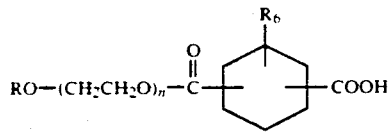

wherein R, R⁶, and n are as defined previously.

The product of the first step is thereafter reacted with a polyglycidyl ether of a polyhydroxy hydrocarbon, a halogenated derivate thereof, or an advanced polyglycidyl ether of a polyhydroxy hydrocarbon to prepare the emulsifier compound of this invention. The reactants are preferably contacted in the presence of a suitable catalyst. The reaction product of the first step is contacted with at least a stoichiometric amount of the glycidyl ether or advancement product thereof. The contacting is performed at a temperature at which the reaction product of the first step reacts with a 1,2-epoxy moiety (1,2-glycidyl ether moiety). The reaction time is chosen to allow substantially complete reaction of the product from the first step.

In the embodiment where the linking group is a dicarboxylic acid or acid anhydride, a poly(ethylene oxide) half ester of a dicarboxylic acid is reacted with a polyglycidyl ether, or advancement product thereof, to prepare the emulsified product. Such a compound preferably corresponds to the formula 20

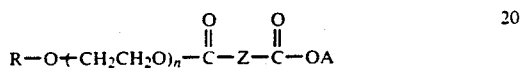

wherein R, Z, A and n are previously defined. In such embodiment the reactants are preferably contacted at a temperature of from about 80° to about 180° C., more preferably from about 120° to about 130° C. The reaction time is preferably from about 0.5 to about 4 hours, more preferably from about 1 to about 2 hours. Preferably, this reaction is performed in the presence of an epoxy resin advancement known to those skilled in the art. Preferable catalysts include ammonium compounds, phosphonium compounds, tertiary amines, or phosphines. Examples of more preferred catalysts include ethyltriphenyl phosphonium, benzyldimethylamine, triphenylphosphine, tributylamine, and the like. The catalyst amount used is that amount sufficient to catalyze the reaction. Preferably from about 0.01 to about 0.5 weight percent is used, and more preferably from about 0.05 to about 0.15 weight percent is used. If desired the emulsifier can be recovered from the reaction mixture. In practice the reaction mixture is then used to form epoxy products without the necessity of recovery. In a preferred embodiment the compounds which are prepared correspond to one of the formulas 21 to 24.

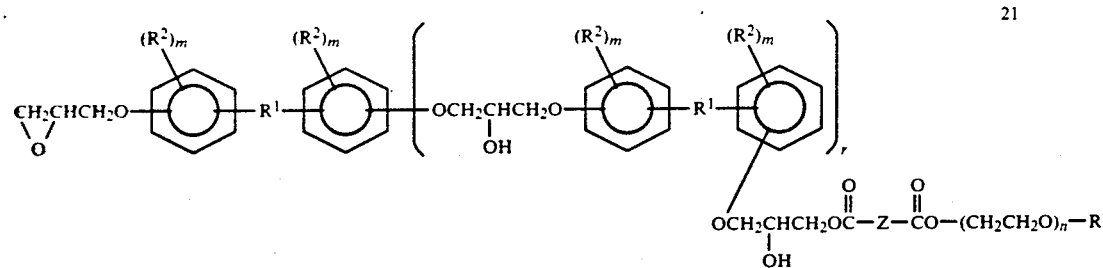

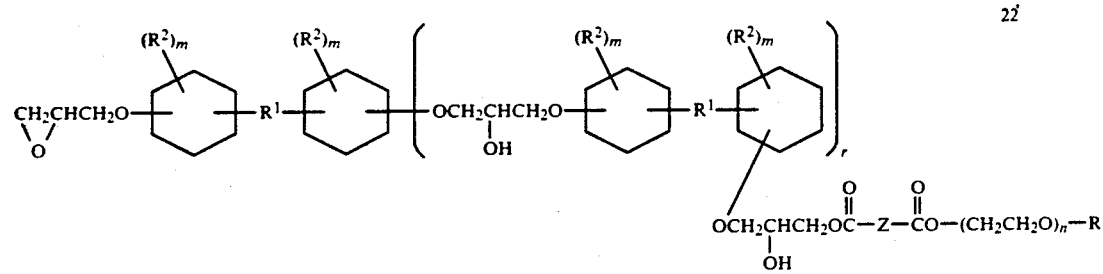

-continued

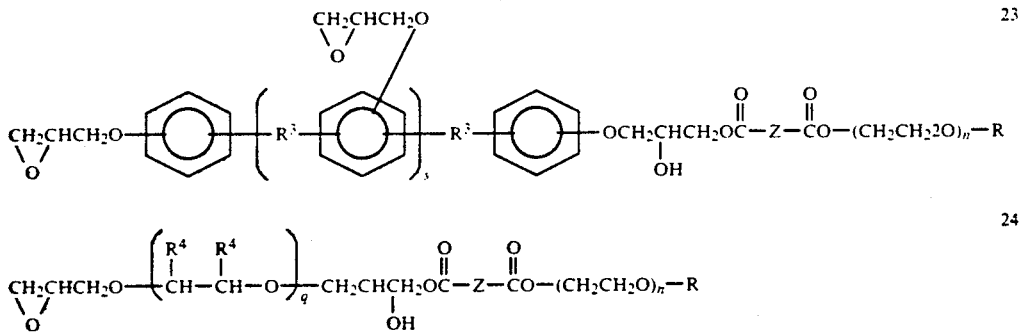

wherein R, R$^1$, R$^2$, R$^3$, R$^4$, q, m, n, r, and s are as defined hereinbefore.

In those embodiments where a stoichiometric ratio of the reaction product of the first step is used as compared to the digylcidyl ether or advancement product thereof, the final product can be then added to an epoxy resin, i.e. polyglycidyl ether of a polyhydroxyhydrocarbon, halogenated derivative thereof or advancement product thereof, in sufficient amount so as to render the composition capable of emulsification in water. Generally a sufficient amount of the emulsifier is added to render the composition emulsifiable in water. Such amount is preferably from about 4 to about 30 weight percent, more preferably from about 4 to about 10 weight percent.

In the embodiment where an excess of the polyglycidyl ether, or advancement product thereof, is used in the process to prepare the emulsified epoxy composition, the reaction product of the first step is added in sufficient amount such that when the second step of the reaction is completed the final product is capable of emulsification in water. Preferably, the amount of emulsifier compound present when the reaction is complete is between about 4 and about 30 weight percent, more preferably between about 4 and about 10 weight percent.

In another embodiment the reaction product of the first step is reacted into an epoxy resin at the same time it is being advanced. In particular the reaction product of the first step is reacted with one or more polyglycidyl ethers of a polyhydroxy hydrocarbon or halogenated derivatives thereof, one or more polyhydroxy hydrocarbons or halogenated derivatives thereof and optionally a carboxyl substituted hydrocarbon.

More particularly such process is a process for the preparation of a water dispersible resin composition which comprises, first contacting a monoalkyl ether of a polyethylene glycol with a dicarboxylic acid or acid anhydride at elevated temperatures under conditions such that an adduct of the monoalkylether of the polyethylene glycol and the dicarboxylic acid or acid anhydride is formed. Thereafter, the process further comprises contacting:

a) the adduct of the monoalkyl ether of the polyethylene glycol with the dicarboxylic acid or acid anhydride;
b) a polyglycidyl ether of a polyhydroxy hydrocarbon or halogenated polyhydroxy hydrocarbon; and
c) optionally a polyhydroxy hydrocarbon, wherein the reactive hydroxy moieties are bound to an aromatic ring, in the presence of a catalyst capable of catalyzing the reaction between the 1,2 glycidyl ethers and hydroxy moieties at elevated temperatures under conditions such that a water dispersible epoxy resin composition is formed;

wherein the residue of the monomethyl ether of the polyethylene glycol has sufficient oxyethylene units to render the epoxy resin composition emulsifiable in water. In this embodiment the polyhydroxy hydrocarbons preferably contain hydroxy groups bound to aromatic rings as they are more reactive in this reaction. The reaction conditions are similar to those described hereinbefore with respect to the reaction of the polyglycidyl ether with the reaction product of the first step. A sufficient amount of the reaction product of the first step is added to render the final product capable of being emulsified in water.

In a preferred embodiment the reaction product of the first step is a half ester. In this embodiment a sufficient amount of the half ester is added to render the final product capable of emulsification in water. Preferably in the second step the reactant amounts are from about 4 to about 10 weight percent of the half ester; from about 60 to about 96 weight percent of one or more polyglycidyl ethers of polyhydroxy hydrocarbons or halogenated derivates thereof; about 0 to about 30 weight percent of one or more polyhydroxy hydrocarbons or halogenated derivates thereof; and from about 0 to about 20 weight percent of a carboxyl substituted hydrocarbon.

In a more preferred embodiment the reactants comprise a half ester, a diglycidyl ether of bisphenol, a bisphenol, a diglycidyl ether of a polyalkylene oxide glycol, and a fatty acid dimer or trimer. Preferably the reactants are added in the following amounts; from about 4 to about 10 weight percent of the half ester; from about 50 to about 70 weight percent of the diglycidyl ether of a bisphenol; from about 5 to about 15 weight percent of bisphenol; from about 5 to about 15 weight percent of a diglycidyl ether of a polyethylene oxide glycol or polypropylene oxide glycol; and from about 5 to about 15 weight percent of a fatty acid dimer or trimer.

In one embodiment the invention comprises a water emulsifiable composition which comprises the reaction product of
a) one or more of the compounds corresponding to formulas 21 to 24;
b) one or more of the compounds corresponding to one of formulas 8 to 11;
c) one or more compounds corresponding to one of formulas 4 or 6; and
d) optionally a one or more carbonyl substituted hydrocarbons corresponding to hydrocarbons corresponding to formula 12.

The epoxy resin compositions can be emulsified in water. Such emulsions are prepared by contacting the epoxy resin composition containing the emulsifier compound of this invention with water. In a preferred embodiment water is at ambient temperature, about 20° to about 25° C. It is also preferred that the water is added to the epoxy resin composition containing the emulsifier compound over a period of several minutes to several hours, preferably about 30 to about 120 minutes; most preferably 30 to 60 minutes. The emulsions generally have a sufficient amount of epoxy resin to allow the resin to form a continuous coating when the emulsion is applied to a surface and the water is evaporated away. Preferably the emulsions contain about 20 to about 80 weight percent of epoxy resin, more preferably from about 40 to about 70 weight percent, and most preferably from about 50 to about 60 weight percent. Preferably the epoxy resin emulsion has a particle size of from about 0.1 to about 1 micrometers, more preferably from about 0.1 to about 0.3 micrometers, and most preferably from about 0.1 to about 0.3 micrometers.

The epoxy resins emulsions of this invention are useful in coatings. Such emulsions can be contacted with an epoxy resin curing agent and then applied to a surface to be coated. Alternatively the emulsion may be contacted with the curing agent after being contacted with a surface to be coated. In one embodiment the coating composition comprises first water; second a composition comprising a polyglycidyl ether of a polyhydroxy hydrocarbon, halogenated polyhydroxy hydrocarbon, or the reaction product of a polyglycidyl ether of a polyhydroxy hydrocarbon, or halogenated polyhydroxy hydrocarbon with one or more polyhydroxy hydrocarbons, halogenated polyhydroxy hydrocarbons, or carboxylic acid substituted hydrocarbons, and a sufficient amount of a compound corresponding to formula 1 to render the epoxy resin composition water emulsifiable; and third an epoxy resin curing agent. The curing agents which may be used in this invention are those known in the art for curing epoxy resins and include diamines and polyamines or adducts of such polyamines with epoxy resin, such as for example a reaction product of an excess of equivalents of isophorone diamine with a diglycidyl ether of bisphenol A such reaction product having an amine equivalent weight of 115;, diamidoamines and polyamidoamines, and acylic anhydrides. Preferred are the polyamines. Preferred curing agents include aliphatic polyamines, polyglycoldiamines, polyoxypropylene diamines, polyoxypropylenetriamines, amidoamines, imidazolines, reactive polyamides, ketimines, araliphatic polyamines (i.e. xylylenediamine), cycloaliphatic amines (i.e. isophoronediamine or diaminocyclohexane) menthane diamine, 3,3-dimethyl- 4,4-diamino-dicyclohexylmethane, heterocyclic amines (aminoethyl piperazine), aromatic polyamines, (methylene dianiline), diamino diphenyl sulfone, mannich base, phenalkamine, N,N',N''-tris(6-aminohexyl) melamine, and the like.

The curing agents used in this invention can be water dispersible. In those embodiments where a non-dispersible curing agent is used sufficient emulsifier should be present in dispersion containing such a curing agent to render the entire dispersion stable in water, including the curing agent.

In some embodiments an organic solvent may be added to the aqueous emulsion. Preferably 10 percent or less of such a solvent may be used. Preferred solvents which may be used include butyrolactone, N-methyl pyrrolidone, alcohols, (i.e., isopropanol), glycol ethers (i.e. methoxypropanol, ethoxyethanol, phenoxyethanol and the like). Some formulation solvents of aromatic nature like xylene may be used. The solvent may be added for the purpose of coalescence to improve film formation characteristics during the coating process, especially when higher molecular weight epoxy resins are used.

The epoxy resins of this invention are contacted with sufficient curing agents to cure the resin. Preferably the ratio of glycidyl ether equivalents to equivalents of moieties which react with the glycidyl ether moieties is from about 0.6:1.4 to about 1.4:0.6: more preferably about 0.8:1.2 to about 1.2:0.8 and most preferably about 0.9:1.1 to 1.1:0.9.

The emulsions of this invention may include pigments, dyes, stabilizers, plasticizer's and other conventional additives.

SPECIFIC EMBODIMENTS

The following examples are included for illustrative purposes and are not intended to limit the scope of claims herein. All parts and percentages stated herein are by weight unless otherwise indicated.

EXAMPLE 1

Preparation of Half Ester of methyl ether of a polyethylene glycol where n=44.7

In a round bottom flask equipped which a Schlenk adaptor and a condenser are introduced 200 grams (0.1 mole) of a methyl ether of a polyethyleneoxide glycol of a molecular weight of 2000 (n=44.7) available from Fluka, and 16.8 grams (0.1 mole) of 4-methylhexahydrophtalic anhydride (MW 168, d 1.159, available from Huels AG). The reactants are heated for two hours at 110° to 120° C. A half ester of the methylether of polyethyleneoxide glycol (n=44.7) corresponding to formula 25

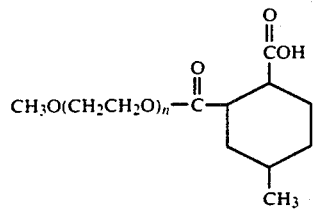

is recovered in quantitive yields.

EXAMPLE 2

Reaction of Half Ester of Example 1 with an Epoxy Resin.

A liquid Bisphenol A based glycidyl ether with an epoxide equivalent weight of 177-188 (63.43 g; 352.4 meq) available from The Dow Chemical Company under the trademark DER* 331 is mixed with the reaction product of Example 1 (191 g, 88.1 meg) in a three-neck round bottom flask equipped with a $N_2$ inlet condenser and thermometer. The flask is immersed in an oil bath at 100° C. and 300 ppm of an ethyl triphenyl phosphonium acetate solution (70 percent by weight of catalyst in methanol solution) are added and the reaction proceeds for 1 to 2 hours. Advancement is controlled by thin layer chromatography on $SiO_2$ using 10 percent methanol in $CH_2Cl_2$ as eluent. $R_f$ for the epoxy resin is 0.74, for the half ester $R_f=0$ and $R_f<0.74$ for the reaction product of epoxy resin with the half ester. which corresponds to formula 26 troller are introduced 85 g of Novolac based epoxy resin (EEW 176, DEN* 438 *Trademark of The Dow Chemical Company), which corresponds to formula 27

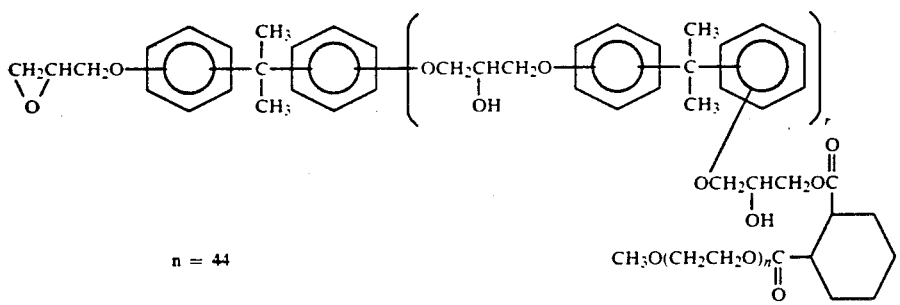

n = 44

*Trademark of The Dow Chemical Company

Purification is carried out by flash chromatography, on

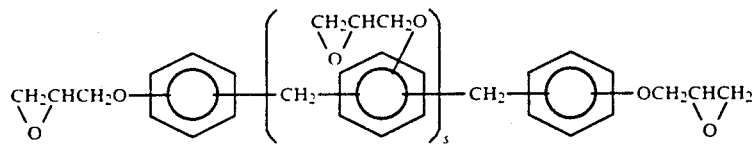

800 g of silica gel. Kieselgel TM 60. First elution with about 2000 ml of 15% ethyl acetate in $CH_2Cl_2$, and followed by 2000 ml of 15% methanol in $CH_2Cl_2$. 167 gms of the diester are recovered as a soft white microcrystalline solid from the second elution. The yield is 75%.

EXAMPLE 3

Emulsification of Resin

In a 150 ml aluminum cup are introduced 18 g of a liquid epoxy resin. Bisphenol A based glycidyl ether with an epoxy equivalent weight of 177–188 DER* 331 liquid epoxy resin and 0.8 g of the reaction product from example 2. (MW 2588). Water is added dropwise while stirring at 2000–5000 rpm. The addition of water generates first a highly viscous liquid which upon the addition of more water yields a low viscosity emulsion. The total water added is 18.8 g to result in a 50% emulsion in water. The viscosity is 21±1 cps (Brookfield TM VT viscometer; spindle 2. 60 rpm). The particle size is measured at 2580±40 Angstroms.

EXAMPLE 4

Emulsification of Resin 18.11 g of bisphenol A based liquid epoxy resin with and epoxy equivalent weight of 177–188 (DER* 330 available from the Dow Chemical Company) are reacted with 0.687 g of the half ester reaction product of Example 1, under the conditions described in Example 2. The diester reaction product is not recovered from the reaction mixture. Water, 18.8 g, is added dropwise to the reaction mixture as described in Example 3. A room temperature stable emulsion is obtained.

EXAMPLE 5

Reaction of Novolac Resin with Half Ester of Example 1

Into a 300 ml glass reactor equipped with condensor, mechanical stirrer, nitrogen inlet and temperature controller are introduced 85 g of Novolac based epoxy resin (EEW 176, DEN* 438 *Trademark of The Dow Chemical Company), which corresponds to formula 27 wherein s is 1.6 and 15 g of the half ester prepared in Example 1, along with 0.26 g of an ethyl triphenyl phosphonium acetate solution (70 percent by weight of catalyst in methanol solution). The mixture is heated to 120° C. and maintained at that temperature for 90 minutes. Analysis reveals the epoxy equivalent weight is 217 and the residual percent acid is less than 0.026 percent. After cooling to 90° C., 100 g of water are added with stirring. A white emulsion is obtained. The emulsion has a viscosity of 4000 cps (Brookfield TM LVT, spindle 2, 3 rpm). The particle size is measured at 2600±40 Angstroms.

EXAMPLE 6

Reaction of Half Ester with hydrogenated Bisphenol A based glycidyl ether

In a 300 ml glass reactor equipped with nitrogen inlet, condenser, mechanical stirrer and temperature regulator are introduced 80 g of a diglycidyl ether of hydrogenated Bisphenol A and 20 grams of the compound corresponding to formula 28

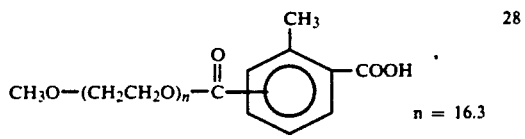

n = 16.3 and 0.26 g of an ethyl triphenyl phosphonium acetate solution (70% catalyst in methanol solution). The mixture is heated to 120° C. and held there for 90 minutes. Analysis demonstrate the EEW of the resin is 260 and percent residual acid is 0.003 percent. After cooling to 90° C., 100 g of water is added dropwise. The final viscosity is 122±40 cps.

EXAMPLE 7

Reaction of half Ester with Bisphenol A and tetrabrominated bisphenol A diglycidyl ether In a 300 ml glass reactor equipped with a condenser, nitrogen inlet, mechanical stirrer and temperature control system are introduced 91 g of an epoxy resin prepared from the diglycidyl ether of Bisphenol A and tetrabromo Bisphenol A (EEW=430) and 9 grams of a compound corresponding to formula 29,

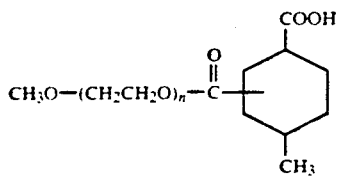

having a MW of 2018. The latter compound is prepared via the process described in Example 1 from a compound corresponding to the structure of formula 30

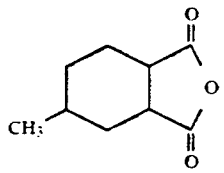

and a compound of the structure $CH_3O(CH_2CH_2O)_nH$ where n=4.3 (MW 1850). The mixture is heated to 130° C. and maintained at that temperature for 2 hours. Thereafter the acid content was determined by titration with potassium hydroxide (0.1N) in acetone and found to be less than 0.01%. The final EEW is 485. The vessel is cooled to 95° C. and water (100 g) is added dropwise with stirring. The viscosity increases and phase inversion occurs. A low viscosity emulsion is obtained. The final emulsion is 50 percent by weight epoxy resin. The viscosity of the emulsion (Brookfield TM LVT, spindle 2, 60 RPM) is 257±40 cps. After 30 minutes, some settling occurs and the emulsion gels. A fluid emulsion is regenerated upon shaking. The emulsion is thixotropic.

EXAMPLE 8

Half ester of Resin A

In a 1 liter glass reactor equipped with a condensor a mechanical stirrer, nitrogen inlet and heating mantel are introduced 100 g of polypropylene oxide diglycidyl ether (DER* 732 *Trademark of The Dow Chemical Company, EEW 327.1), 230.6 g of Bisphenol A (EW 114) and 0.71 g of an ethyl triphenyl phosphonium acetate solution (70% catalyst in methanol solution). The mixture is heated to 160° C. and an exotherm is allowed to occur. After 1 hour all the epoxy moieties have reacted. To the reaction mixture is added 669.4 g of a liquid epoxy resin, Bisphenol A based diglycidyl ether EEW 177-188 (DER* 330, available form The Dow Chemical Company) and an exotherm occurs, (starting at 160° C.). After the reaction is complete (60 min) the resin is cooled to 100° C. and the reactor is emptied. The resulting product has an epoxy equivalent (EEW) of 486. This product is referred to herein as Resin A.

In a 300 ml glass reactor equipped with condensor, nitrogen inlet, mechanical stirrers and temperature regulator are introduced 80 g of Resin A and 8 g of a half ester corresponding to formula 31

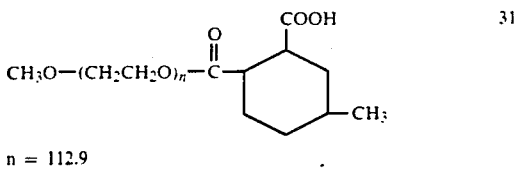

n = 112.9 and 0.226 of ethyl triphenyl phosphonium acetate (70 percent by weight in methanol). The mixture is heated to 120° C. and held at such temperature for 90 minutes, after which time the acid content is 0.009 percent. 20 g of 3-methyloxybutanol are added. After cooling to 90° C., 108 g of water is added dropwise with stirring. The resulting emulsion has the following characteristics: a viscosity of 24889±100 cps (Brookfield TM HBT, spindle 5, 50 rpm, 25° C., and the emulsion remains unchanged over 12 weeks at 40° C.

EXAMPLE 9

Into a 300 ml glass reactor equipped, as described in Example 2, are introduced 80 g of resin A (EEW=486), and 8 g of the half ester corresponding to formula 32

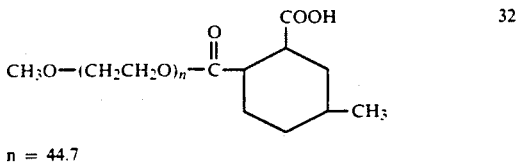

n = 44.7 and 0.226 grams of an ethyl triphenyl phosphonium acetate solution (70% by weight catalyst in methanol solution). The mixture is heated to 120° C. for 2 hours, after which time the residual acid is 0.009 percent. 20 g of 3-methoxybutanol is added and the temperature is decreased to 90° C. Water (108 g) is added dropwise with stirring. The viscosity is 2260±50 cps, (Brookfield TM HBT, spindle 5, 50 RPM, 25° C.). The emulsion remains unchanged over 7 days, after which time settling is observed.

EXAMPLE 10

In a 1 liter glass reactor equipped as described in Example 8 are introduced 752 g of a liquid epoxy resin (a Bisphenol A based diglycidyl ether with an EEW of 177-188), 248 g of Bisphenol A and 0.71 g of an ethyl triphenyl phosphonium acetate solution (70% by weight catalyst in methanol solution). The mixture is heated to 150° C. and an exotherm occurs. After cooling to ambient temperature, the final EEW is 492. This Resin shall be referred to herein as Resin B.

In a 300 ml glass reactor equipped as described in Example 1 are introduced 80 g of Resin B and 8 grams of the half ester prepared in Example 1, and 0.12 g of an ethyl triphenyl phosphonium acetate solution (70% by weight of catalyst in methanol). The mixture is heated to 120° C. and for 1½ hours, after which time the residual acid amount is 0.005 percent. 20 g of 3 methoxybutanol is added and the temperature is decreased 90° C. 108 g of water is added dropwise with stirring. The resulting emulsion has a viscosity of 7870±50 cps (Brookfield TM, HBT, spindle 5, 20 RPM. 25° C.). The emulsion is stable for 2 days at ambient temperature.

EXAMPLE 11

In a stainless steel reactor are introduced 3365 g of a Bisphenol A based liquid epoxy resin (EEW 182-192, DER* 331 available from The Dow Chemical Company), 365 g of a dimeric fatty acid (PRIPOL TM 1022, MW=600 available from UNICHEMA); 690 g of a diglycidyl ether of polypropyleneoxide (MW 690); 580 g of Bisphenol A and 8.2 g of an ethyl triphenyl phosphonium acetate solution (70% by weight of catalyst). The mixture is heated to 150° C. and an exotherm occurs to 180° C. The final product has an EEW of 350, and percent epoxy of 12.27. This resin is referred to herein as Resin C. The reaction product is cooled to 90° C. and removed from the reactor.

690 g of Resin C are placed in the reactor described in this Example. 76.7 g of the half ester prepared in Example 1 (n=44.7 MW 2168) and 0.2 g of an ethyl triphenyl phosphonium acetate solution (70% by weight of catalyst in methanol) are added to the reactor. The reaction is carried out at 100° C. for 90 minutes. The final acid content is less than 0.05 percent and the EEW is 391. The reaction mixture is cooled to 85° C. and water (770 g) is added dropwise with stirring, over 20 minutes. The temperature decreased to 50° C. The resultant emulsion has a viscosity at 25° C. of 8300±100 cps (Brookfield TM LVT, spindle 3, 12 RPM) and a particle size of 2750±50 Angstroms. The emulsion is stable for over 4 months at 25° C. This emulsion is referred to herein as Resin C emulsion.

EXAMPLE 12

Three coatings are prepared from Resin C emulsion of Example 11, using three different curing agents. In coating C-1 the curing agent is a reactive polyamide, with an amine value of 300-340 mg KOH/g. (DEH* 12-E * Trademark of The Dow Chemical Company). In coating C-2 the curing agent is a modified reactive polyamide comprising Versamide TM 115 75% and an isophorone diamine adduct 25% with an amine hydrogen equivalent weight of about 170. In coating C-3 the curing agent is a modified reactive polyamide for waterbourne coatings, amine hydrogen equivalent weight of 285 (Ancamide TM 360 LC available from Anchor Chemical) in a 50 percent solids in water emulsion. The coatings are formulated from the Resin C emulsion, the curing agent and deionized water to get a 50 percent solids in water emulsion. Water is added to achieve equivalent viscosities of about 1500 mPa.s (Brookfield TM spindle 3, 50 rpms). The dispersions are coated onto alkali phosphatized steel panels (Bonder ® 1041) on which the mechanical properties of the films are tested along with long term immersion in water. Sandblasted, cold rolled steel panels are also coated to assess the salt fog resistance of the films. The formulation and results are compiled in Tables I and II.

Several tests are performed to determine the properties of the coatings. The solvent resistance is determined by the number of acetone "double rubs" needed before the film is destroyed and the substrate exposed. The test is subjective in that the force applied during the test varies from one experimentor to another, but it offers a comparison between different systems.

The adhesion of the coatings is determined by the crosshatch/tape method (DIN 53151). The results show that adhesion to the test panels is excellent in all three systems.

TABLE I

| | Formulations | | |
|---|---|---|---|
| | C-1 | C-2 | C-3 |
| Resin C emulsion (50% solids in water) | 58.1 | 63.7 | 61.0 |
| D.E.H.* 12E | 9.9 | — | — |
| Versamide 115 and isophorone diamine adduct | — | 14.0 | — |
| Casamid TM 360LC (50% solids in water) | — | — | 23.8 |
| deionized water | 32.0 | 22.3 | 15.2 |
| Total | 100.0 | 100.0 | 100.0 |

TABLE II

| | C-1 | C-2 | C-3 |
|---|---|---|---|
| Solids, wt % | 39 | 46 | 42 |
| Viscosity, 22° C., mPa.s | ca 11000 | ca 1500 | ca 1500 |
| Through film dry time, hours | 14 | 14 | 15 |
| Film thickness, micrometers | 28 | 30 | 29 |
| Acetone double rubs | 55 | 65 | 58 |
| Adhesion, crosshatch/tape % | 100 | 100 | 100 |
| Erichsen flexibility, mm | 10.4 | 10.0 | 9.7 |
| Impact lb in Front | >160 | >160 | >160 |
| Reverse | >160 | >160 | >160 |

The water resistance is tested by the following procedure. Fully cured panels were placed in a beaker containing tap water and during the test period were measured for harness loss. The results are compiled in Table III.

TABLE III

| | Formulations | | |
|---|---|---|---|
| Hardness versus immersion time | C-1 | C-2 | C-3 |
| Initial pendulum hardness | 172 | 225 | 234 |
| 1 day immersion | 93 (54%) | 126 (56%) | 115 (44%) |
| 10 day immersion | 120 (70%) | 168 (75%) | 167 (71%) |
| 21 day immersion | 115 (67%) | 165 (74%) | 169 (72%) |
| 35 day immersion | 114 (66%) | 170 (75%) | 163 (70%) |
| 50 day immersion | 118 (69%) | 146 (65%) | 157 (67%). |

The values given in brackets are the remaining hardness as a percentage of the initial. The panels are removed from the beaker, dried with a paper towel and pendulum hardness immediately recorded; no recovery period is allowed.

Initially, after 1 day immersion, a drop of approximately 50% in pendulum hardness is observed. After 10 days the hardness increased and finally stabilised at roughly 70% of the initial value. After 7 weeks exposure, adhesion failure at the (unprotected) edges is seen to occur in all three of the water-based coatings. All three of the adhesion failures are caused by the presence of water beneath the coating and is always initiated at the liquid/vapour interface.

What is claimed is:

1. A composition of the formula

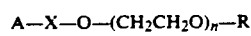

A—X—O—(CH$_2$CH$_2$O)$_n$—R wherein:
A is the residue of a polyglycidyl ether of a polyhydroxy hydrocarbon, and is the reaction product of an epihalohydrin with one or more polyhydroxy hydrocarbons or halogenated polyhydroxy hydrocarbons; or the reaction product of a polyglycidylether of a polyhydroxy hydrocarbon with one or more polyhydroxy hydrocarbons, halogenated polyhydroxy hydrocarbons or carboxyl acid hydrocarbon or a mixture thereof;

X is the residue of a difunctional compound which is capable of reacting with the primary hydroxy moiety of a monoalkylether of a polyethylene glycol and a 1,2-glycidyl ether moiety;

R is $C_{1-10}$ alkyl moiety; and, n is a positive real number such that the composition is emulsifiable in water.

2. The composition of claim 1 wherein:

A is the residue of a polyglycidyl ether of a polyhydroxy hydrocarbon which is the reaction product of an epihalohydrin with one or more of the polyhydroxy hydrocarbons selected from the group of compounds corresponding to the formulas

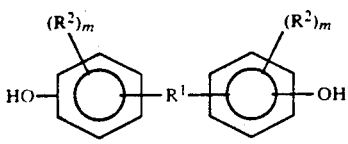

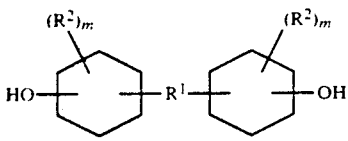

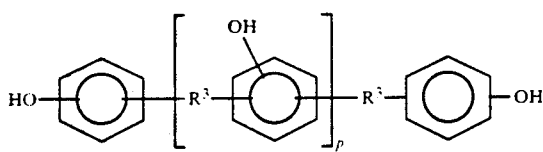

or the reaction product such a polyglycidyl ether of a polyhydroxy hydrocarbon with one or more polyhydroxy hydrocarbons, halogenated polyhydroxy hydrocarbons or carboxyl substituted hydrocarbons;

wherein:

$R^1$ is $C_{1-10}$ alkylene, $C_{1-10}$ haloalkylene, $C_{4-10}$ cycloalkylene, carbonyl, sulfonyl, sulfinyl, oxygen, sulfur or a direct bond;

$R^2$ is $C_{1-3}$ alkyl or a halogen;

$R^3$ is $C_{1-10}$ alkylene;

$R^4$ is H or methyl, with the proviso that only one $R^4$ on a ethylene unit can be methyl;

m is independently in each occurrence an integer of 0 to 4;

p is a positive real number from 0 to 10; and q is a positive real number of from 1 to 80.

3. The composition of claim 2 wherein X corresponds to the formula

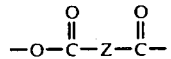

wherein Z is a $C_{1-20}$ hydrocarbylene moiety wherein the carbonyl moiety is bound to the residue of the poly(oxyethylene) monoalkyl ether.

4. The composition of claim 3 wherein Z is $C_{1-20}$ alkylene, $C_{3-20}$ arylene, or $C_{6-20}$ alkyl polyoxyethylene substituted arylene.

5. The composition of claim 4 which comprises a compound of one of the formulas:

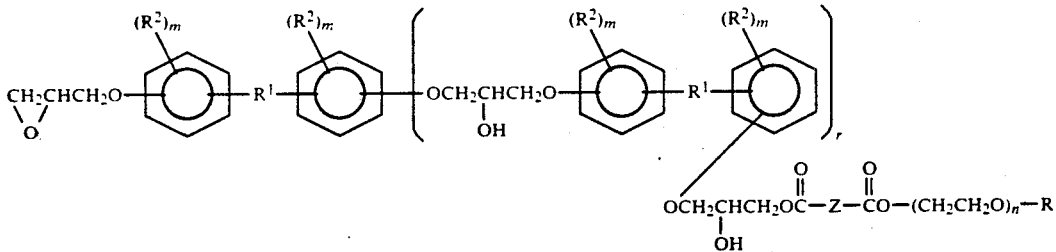

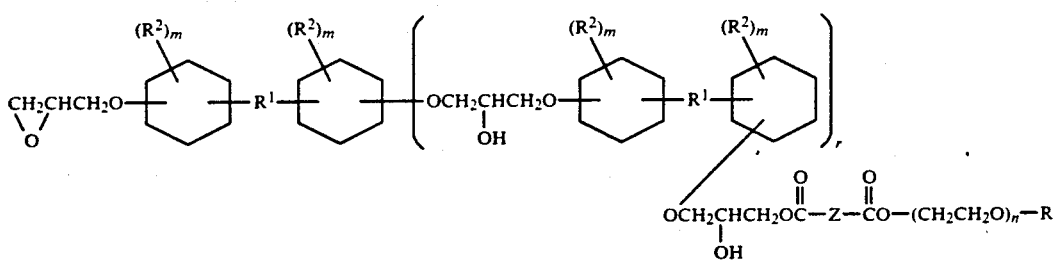

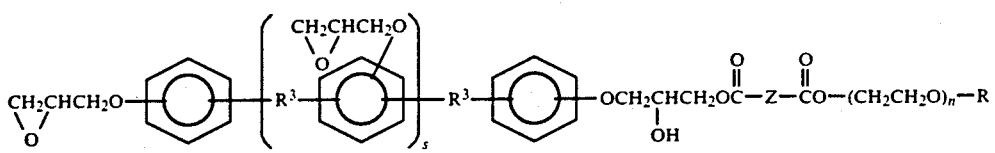

-continued

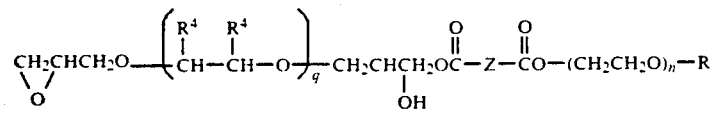

wherein:
- $R^1$ is $C_{1-10}$ alkylene, $C_{1-10}$ haloalkylene, $C_{4-10}$ cycloalkylene, carbonyl, sulfonyl, sulfinyl, oxygen, sulfur or a direct bond;
- $R^2$ is $C_{1-3}$ alkyl or a halogen;
- $R^3$ is $C_{1-10}$ alkylene;
- $R^4$ is H or methyl, with the proviso that only one $R^4$ on a ethylene unit can be methyl;
- m is independently in each occurrence an integer of 0 to 4;
- q is a positive real number of from 10 to 80;
- r is a positive real number of from 0 to 40;
- s is a positive real number of from 0 to 10.

6. The composition of claim 5 wherein Z is

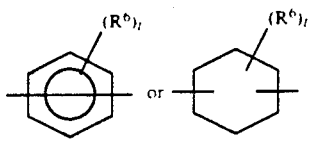

wherein:
- $R^6$ is $C_{1-10}$ alkyl; and,
- t is 0 or 1.

7. A water emulsifiable composition which comprises
I. a polyglycidyl ether of a polyhydroxy hydrocarbon, halogenated polyhydroxy hydrocarbon, or the reaction product of a polyglycidyl ether of a polyhydroxy hydrocarbon, or halogenated polyhydroxy hydrocarbon with one or more polyhydroxy hydrocarbons, halogenated polyhydroxy hydrocarbons, or a carboxyl substituted hydrocarbon; and
II. a sufficient amount of the composition of claim 1 to render the composition water emulsifiable.

8. The composition of claim 7 wherein polyhydroxy hydrocarbon is selected from the group of compounds corresponding to the formulas

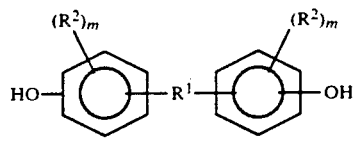

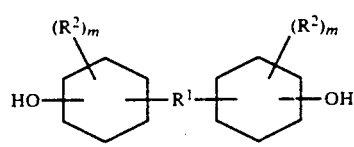

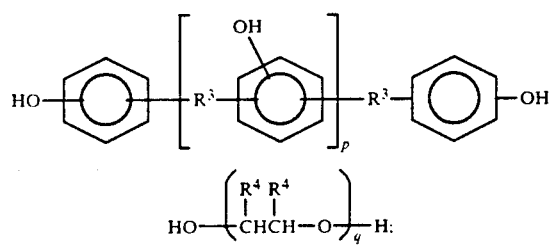

wherein:
- $R^1$ is $C_{1-10}$ alkylene, $C_{1-10}$ haloalkylene, $C_{4-10}$ cycloalkylene, carbonyl, sulfonyl, sulfinyl, oxygen, sulfur or a direct bond;
- $R^2$ is $C_{1-3}$ alkyl or a halogen;
- $R^3$ is $C_{1-10}$ alkylene;
- $R^4$ is H or methyl, with the proviso that only one $R^4$ on a ethylene unit can be methyl;
- m is independently in each occurrence an integer of 0 to 4;
- p is a positive real number from 0 to 10;
- g is a positive real number of 1 to 80.

9. The composition of claim 7 wherein component I is present in between about 70 and 96 percent by weight; and component II is present in between about 4 and 30 percent by weight.

10. The composition of claim 9 which comprises between about 4 and 30 percent by weight of a compound corresponding to one of the formulas

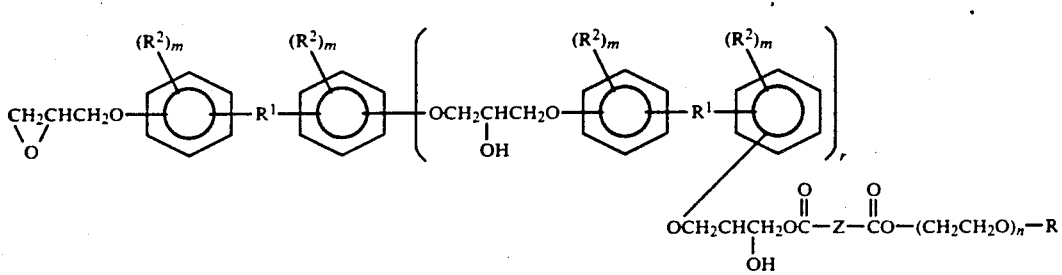

-continued

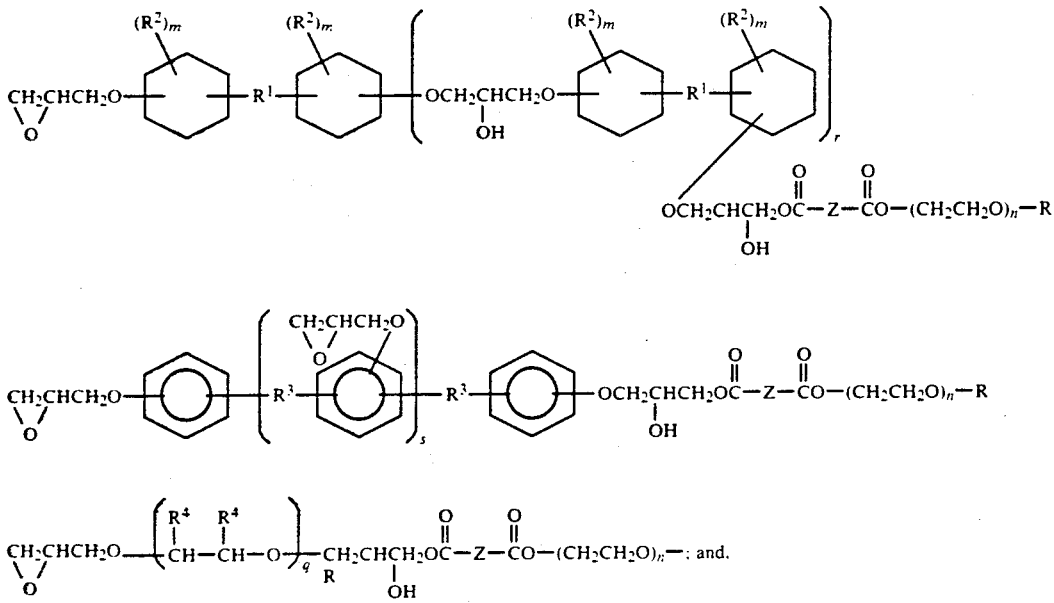

: and between 70 and 96 percent by weight of a compound selected from one of the formulas

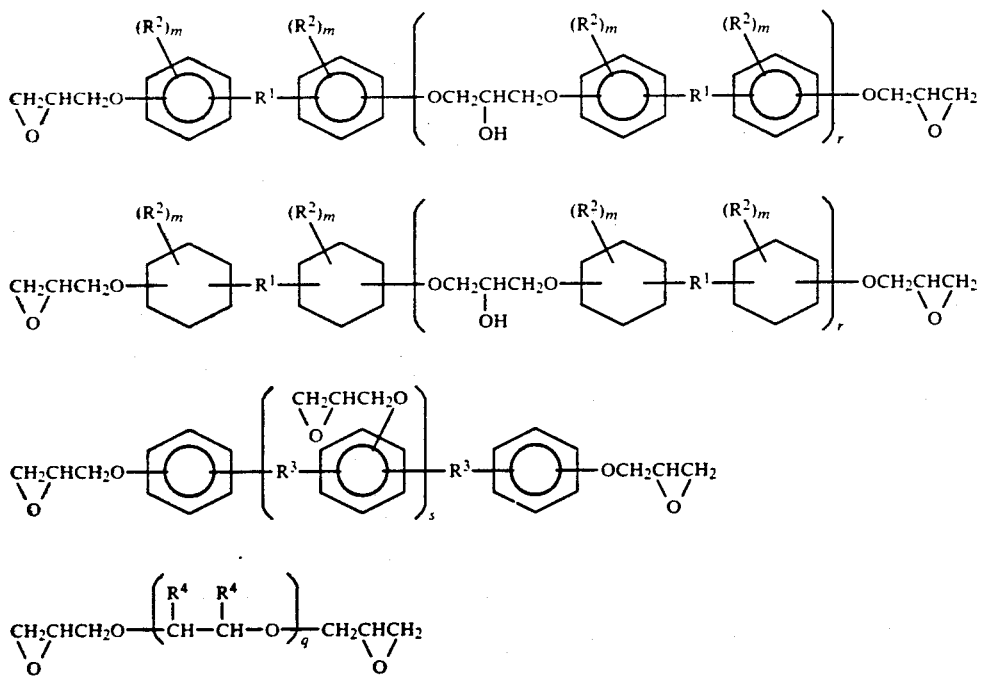

wherein:
R$^1$ is C$_{1-10}$ alkylene, C$_{1-10}$ haloalkylene, C$_{4-10}$ cycloalkylene, carbonyl, sulfonyl, sulfinyl, oxygen sulfur or a direct bond;
R$^2$ is C$_{1-3}$ alkyl or a halogen;
R$^3$ is H or methyl, with the proviso that only one R$^4$ on a ethylene unit can be methyl;

m is independently in each occurrence an integer of 0 to 3;
q is a positive real number of from 10 to 80;
r is a positive real number of from 0 to 40;
s is a positive real number of 0 to 10.

11. A water emulsifiable composition which comprises the reaction product of
A. one or more of the compounds corresponding to the formulas

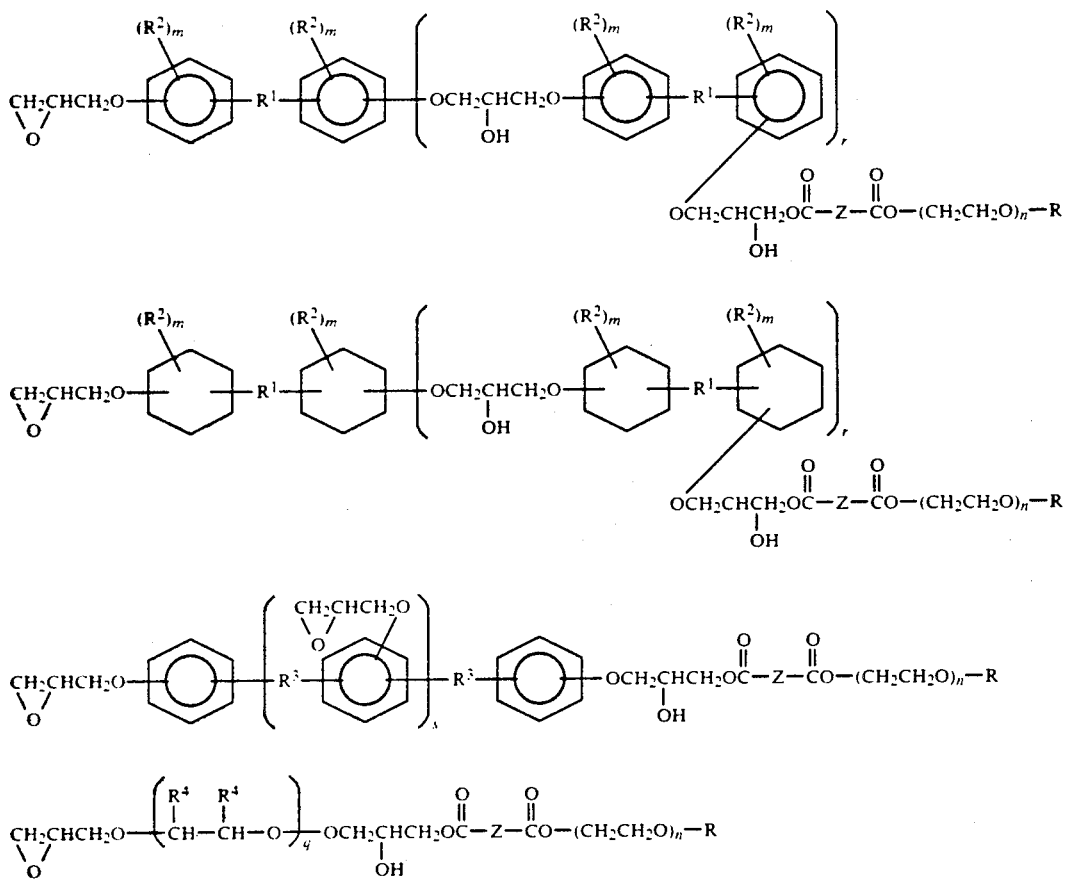
B. one or more of the compounds of corresponding to the formula
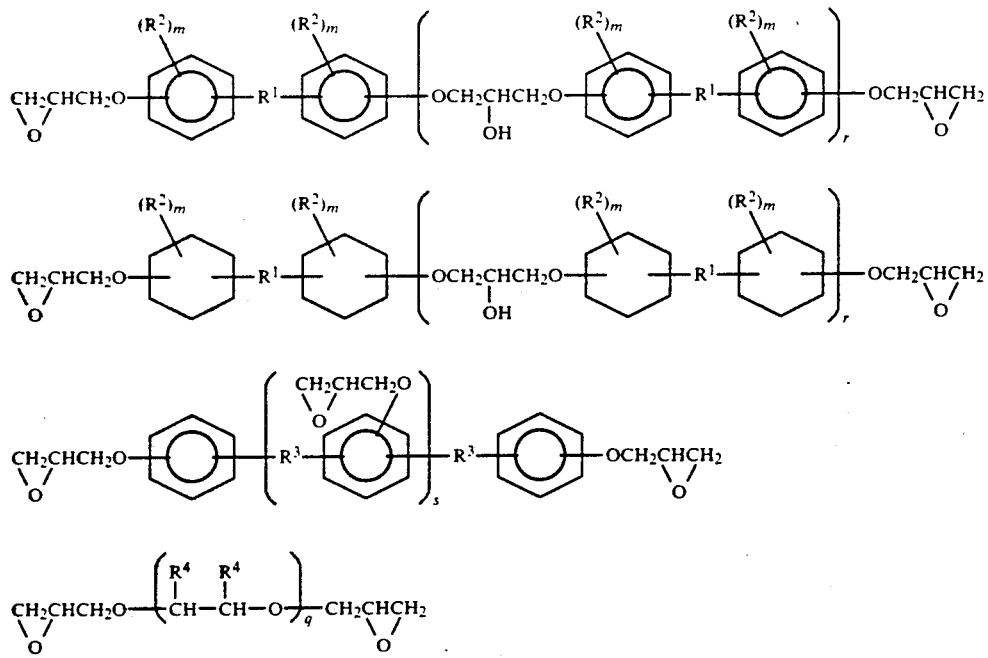
C. one or more of the compounds corresponding to the one of the formula

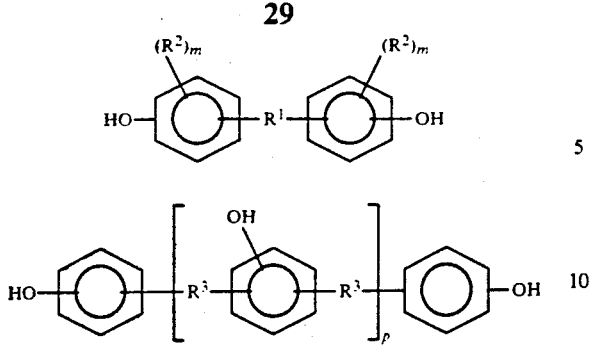

wherein:
R is
$R^1$ is $C_{1-10}$ alkylene, $C_{1-10}$ haloalkylene, $C_{4-10}$ cycloalkylene, carbonyl, sulfonyl, sulfinyl, oxygen, sulfur or a direct bond;
$R^2$ is $C_{1-3}$ alkyl or a halogen;
$R^3$ is $C_{1-10}$ alkylene;
$R^4$ is H or methyl, with the proviso that only one $R^4$ on a ethylene unit can be methyl;
m is independently in each occurrence an integer of 0 to 4;
p is a positive real number of from 0 to 10;
q is a positive real number of from 1 to 80;
r is a positive real number of from 0 to 40;
s is a positive real number of from 0 to 10.

12. A water emulsifiable composition of claim 11 which comprises the reaction product of Component A; Component B, Component C; and D a carboxyl substituted hydrocarbon.

13. An aqueous emulsion which comprises
I. water; and
II. the composition of claim 7; wherein the solid content of the emulsion is between about 20 and 80 percent by weight.

14. A coating composition which comprises
I. water;
II. a composition of claim 7; and
III. an epoxy resin curing agent.

15. A coating composition of claim 14 wherein the curing agents is a water soluble polyamine, polyamide or polyamidoamine capable of curing an epoxy resin.

16. A process for preparing a compound of the formula

wherein
A is the residue of a polyglycidyl ether of a polyhydroxy hydrocarbon and is the reaction product of an epihalohydrin with one or more polyhydroxy hydrocarbons, or halogenated polyhydroxy hydrocarbons, or the reaction product of a polyglycidyl ether of a polyhydroxy hydrocarbon, or halogenated polyhydroxy hydrocarbon with one or more polyhydroxy hydrocarbons, halogenated polyhydroxy hydrocarbons or a carboxyl substituted hydrocarbon;
X corresponds to the formula

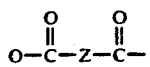

Z is a $C_{1-20}$ hydrocarbon moiety;
R is a $C_{1-10}$ alkyl moiety; and n is a positive real number such that the compound is capable of dispersing an epoxy resin composition in water,
which process comprises
1. Contacting a monomethyl ether of a polyethylene glycol of the formula

with a dicarboxylic acid or acid anhydride which corresponds to one of the formulas

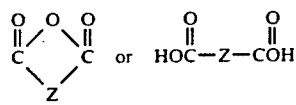

at elevated temperatures under conditions such that a compound of the formula

is prepared
2. Contacting such compound with a polyglycidyl ether of a polyhydroxy hydrocarbon or the reaction product of a polyglycidyl ether of a polyhydroxy hydrocarbon with one or more polyhydroxy hydrocarbons, halogenated polyhydroxy hydrocarbon or a carboxyl substituted hydrocarbon in the presence of a catalyst for the reaction of a 1,2 epoxy moiety with a hydroxy or carboxyl moiety at elevated temperatures under conditions such that a compound of the formula

is prepared.

17. A process for the preparation of a water dispersible resin composition which comprises
1. Contacting a monoalkyl ether of a polyethylene glycol with a dicarboxylic acid or acid anhydride at elevated temperatures under conditions such that an adduct of the monoalkylether of the polyethylene glycol and the dicarboxylic acid or acid anhydride is formed;
2. Contacting the
a) adduct of the monoalkyl ether of the polyethylene glycol with the dicarboxylic acid or acid anhydride,
b) one or more polyglycidyl ethers of a polyhydroxy hydrocarbon or halogenated polyhydroxy hydrocarbon; and
c) optionally a polyhydroxy hydrocarbon containing at least one hydroxy moiety bound to an aromatic ring;
in the presence of a catalyst capable of catalyzing the reaction between the 1,2 glycidyl ethers and hydroxy moieties at elevated temperatures under conditions such that a water dispersible epoxy resin composition is formed;
wherein the residue of the monomethyl ether of the polyethylene glycol has sufficient ethyleneoxide units to render the epoxy resin composition emulsifiable.

18. The process of claim 17 wherein between about 4 and about 30% of the resin composition prepared comprises a reaction product of the adduct of the monoalkyl ether of polyethylene glycol and the dicarboxylic acid or acid anhydride with a polyglycidyl ether of polyhydroxy hydrocarbon or halogenated polyhydroxy hydrocarbon.

19. The process of claim 18 which comprises
A. contacting a monoalkyl ether of a polyethylene glycol of the formula

R—O—(CH₂CH₂O)ₙ—H with a dicarboxylic acid or acid anhydride of the formula

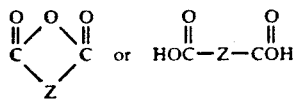

at elevated temperatures under conditions such that a compound is prepared which corresponds to the formula

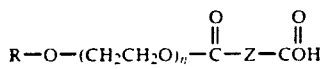

and
B. contacting 1. the reaction product of step A, 2. one or more polyglycidyl ethers of polyhydroxy compounds which correspond to one of the formulas and;

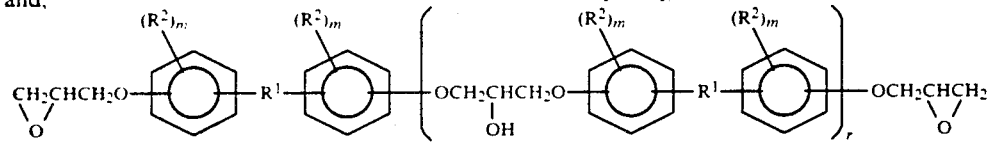

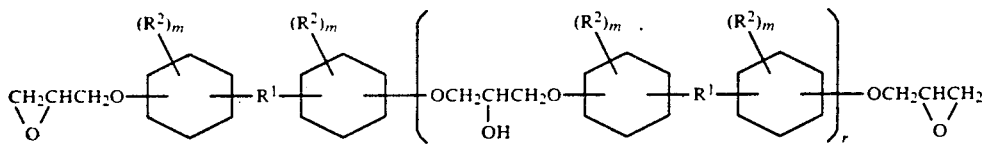

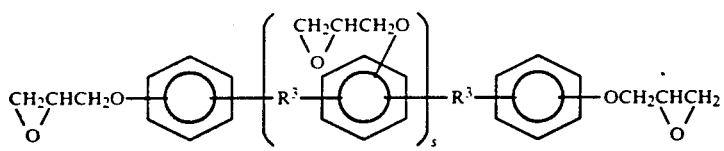

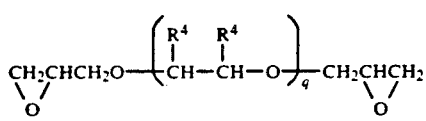

3. optionally, one or more poly hydroxy hydrocarbons or halogenated polyhydroxy hydrocarbons which correspond to one of the formulas;

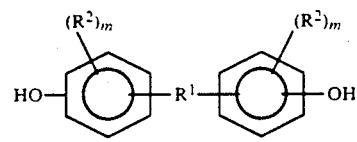

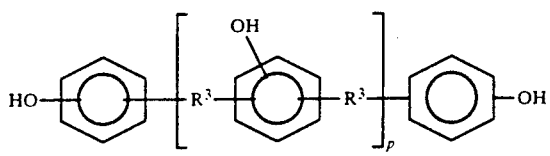

in the presence of a catalyst capable of catalyzing the reaction of a 1,2-glycidyl ether with a primary hydroxy moiety and a carboxylic acid moiety; under such conditions such that a water dispersible epoxy resin is prepared wherein R is $C_{1-10}$ alkyl moiety
$R^1$ is $R^1$ is $C_{1-10}$ alkylene, $C_{1-10}$ haloalkylene, $C_{4-10}$ alkylene, carbonyl, sulfonyl, sulfinyl, oxygensulfur or a direct bond;
$R^2$ is $C_{1-3}$ alkyl or a halogen;
$R^3$ is $C_{1-10}$ alkylene;
$R^4$ is H or methyl, with the proviso that only one $R^4$ on an ethylene unit can be methyl.
Z is a $C_{1-20}$ hydrocarbylene moiety;
m is independently in each occurrence an integer of 0 to 3;
n is a positive real number of from 10 to 80;
p is a positive real number of from 0 to 10;
q is a positive real number of from 1 to 80;

r is a positive real number of from 0 to 10;
s is a positive real number of from 0 to 10.

20. The process of claim 19 wherein the catalyst is an ammonium compound, phosphonium compound, tertiary amine, or phosphine.

21. The process of claim 20 wherein the first step is performed at a temperature of between about 50° C. and about 250° C. and the second step is performed at a temperature of between about 80° C. and 180° C.

22. The process of claim 21 wherein the compounds contacted in the second step further comprise a carboxyl substituted hydrocarbon.

* * * * *